(12) United States Patent
Fujita et al.

(10) Patent No.: US 8,526,289 B2
(45) Date of Patent: Sep. 3, 2013

(54) OPTICAL INFORMATION REPRODUCING APPARATUS AND OPTICAL INFORMATION REPRODUCING METHOD

(75) Inventors: Goro Fujita, Kanagawa (JP); Daisuke Ueda, Kanagawa (JP); Mitsuaki Oyamada, Kanagawa (JP); Takashi Iwamura, Kanagawa (JP); Kimihiro Saito, Kanagawa (JP); Jingcheng Yuan, Kanagawa (JP)

(73) Assignee: Sony Corporation, Tokyo (JP)

( * ) Notice: Subject to any disclaimer, the term of this patent is extended or adjusted under 35 U.S.C. 154(b) by 103 days.

(21) Appl. No.: 12/797,707

(22) Filed: Jun. 10, 2010

(65) Prior Publication Data

US 2010/0322063 A1 Dec. 23, 2010

(30) Foreign Application Priority Data

Jun. 18, 2009 (JP) ................... 2009-145603

(51) Int. Cl.
*G11B 7/00* (2006.01)
*G11B 5/09* (2006.01)
*G11B 20/10* (2006.01)
*G11B 27/30* (2006.01)
*G11B 5/76* (2006.01)
*G11B 5/58* (2006.01)
*G11B 5/55* (2006.01)

(52) U.S. Cl.
USPC ............. 369/121; 369/59.11; 369/59.17; 369/59.23; 369/124.12; 369/124.15; 369/44.41; 369/53.22; 369/53.27

(58) Field of Classification Search
USPC .......... 369/121, 59.11, 59.17, 59.23, 124.12, 369/124.15, 44.41, 53.22, 53.27
See application file for complete search history.

(56) References Cited

U.S. PATENT DOCUMENTS

| 5,333,126 | A | * | 7/1994 | Fukuda et al. | 369/59.24 |
| 6,810,004 | B1 | * | 10/2004 | Sako | 369/275.4 |
| 2001/0046198 | A1 | * | 11/2001 | Morioka et al. | 369/59.18 |
| 2006/0221806 | A1 | * | 10/2006 | Kondo et al. | 369/275.3 |
| 2009/0040897 | A1 | * | 2/2009 | Hirotsune et al. | 369/53.33 |
| 2010/0047506 | A1 | | 2/2010 | Uchiuama et al. | |

FOREIGN PATENT DOCUMENTS

| EP | 0575963 A2 | 12/1993 |
| JP | 03-132972 A | 6/1991 |
| JP | 06-004871 A | 1/1994 |
| JP | 09-275348 A | 10/1997 |
| JP | 10-064193 A | 3/1998 |
| JP | 2005-537658 A | 12/2005 |
| WO | WO 2009/028704 A1 | 3/2009 |

* cited by examiner

*Primary Examiner* — Aneeta Yodichkas
(74) *Attorney, Agent, or Firm* — Wolf, Greenfield & Sacks, P.C.

(57) ABSTRACT

An optical information reproducing apparatus includes: an irradiation section irradiating a light beam onto an optical information recording medium, in which holes are formed along a virtual track on a recording medium, along the virtual track; a light receiving section receiving a reflected light beam when the light beam is reflected by the optical information recording medium and sequentially generating a light receiving signal corresponding to the light intensity; a detection section detecting a variation pattern appearing when a signal level of the light receiving signal changes according to the hole; and a code string generating section, when generating a code string corresponding to the signal level, generating a code corresponding to the one hole from the variation pattern if the variation pattern falls within a range and generating a code string, which includes a plurality of codes, from the variation pattern if the variation pattern exceeds the range.

7 Claims, 13 Drawing Sheets

CONFIGURATION OF OPTICAL INFORMATION RECORDING/REPRODUCING APPARATUS

CONFIGURATION OF OPTICAL INFORMATION RECORDING/REPRODUCING APPARATUS

FORMATION OF BUBBLES

FORMATION OF RECORDING MARK USING BUBBLES

RM

MELTED AREA
VAPORIZED AREA

TIME

ENTIRE CONFIGURATION OF OPTICAL INFORMATION REPRODUCING APPARATUS

CONFIGURATION OF SIGNAL PROCESSOR

TWO TYPES OF RECORDING METHODS

MARK POSITION RECORDING METHOD

MARK LENGTH RECORDING METHOD

FUSION AND DEFORMATION OF RECORDING MARKS

MARK POSITION RECORDING METHOD

MARK LENGTH RECORDING METHOD

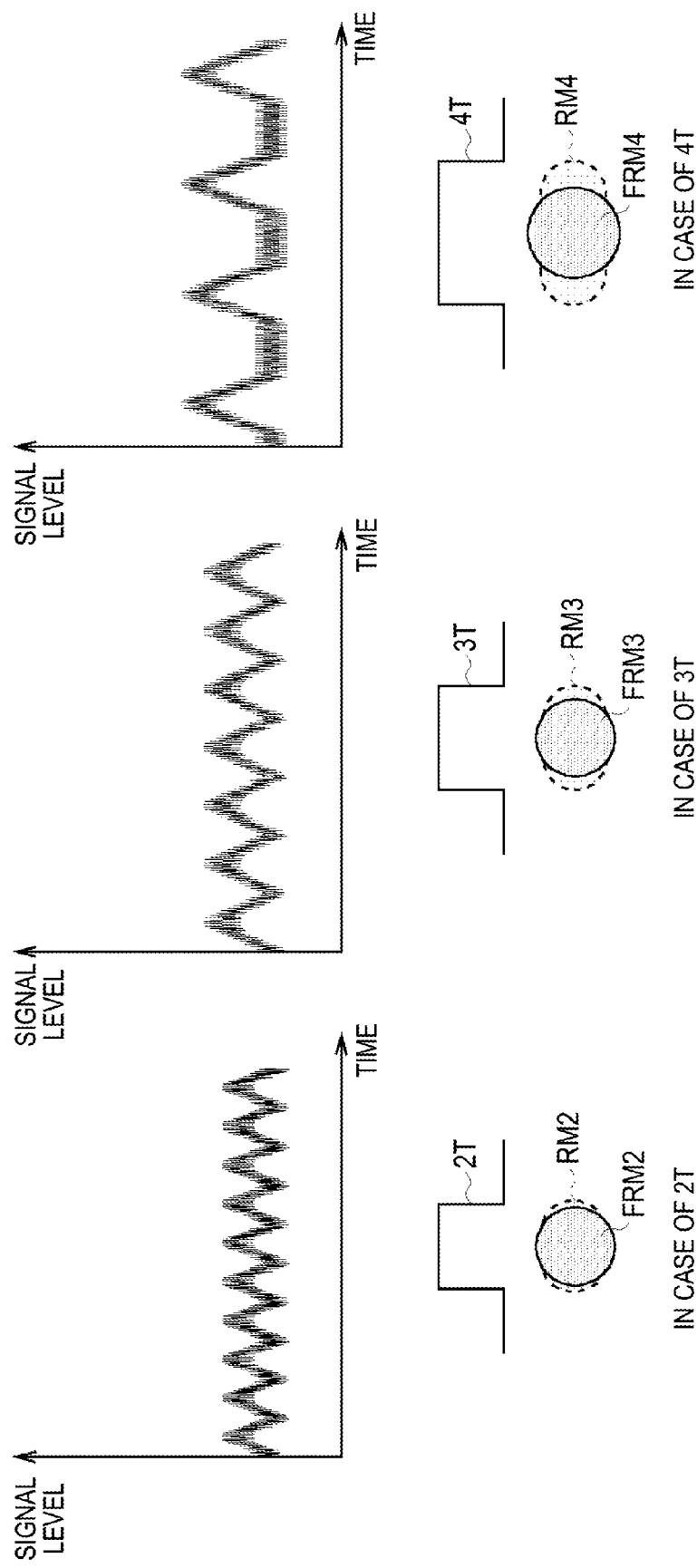

LIGHT RECEIVING SIGNAL IN FIRST EMBODIMENT
FIG.9A
RECORDING CODE
0 1 0 0 0 1 0 0 1 0 1 0 0 0 1 0 0 1 0
FIG.9B
RECORDING MARK
   
FRM2    RM
FIG.9C
LIGHT RECEIVING SIGNAL
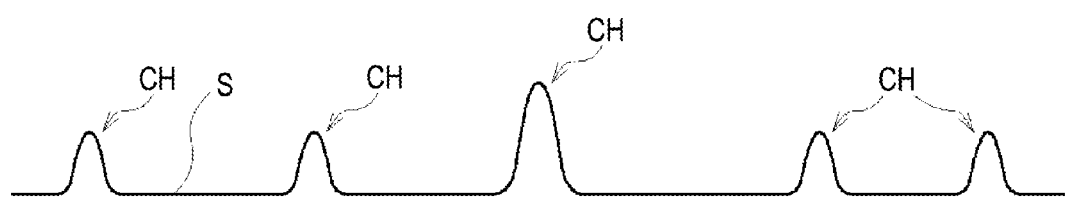

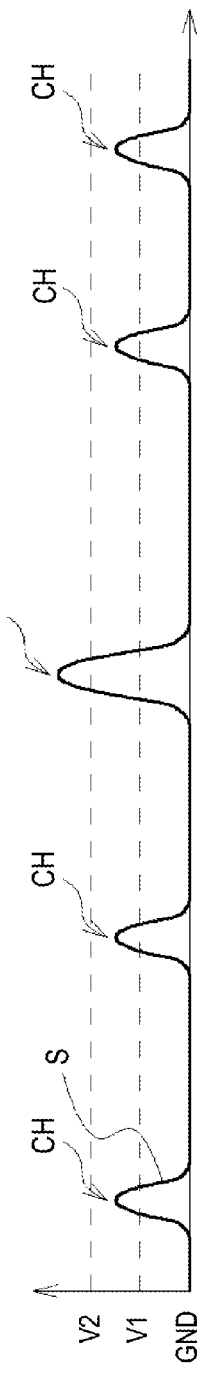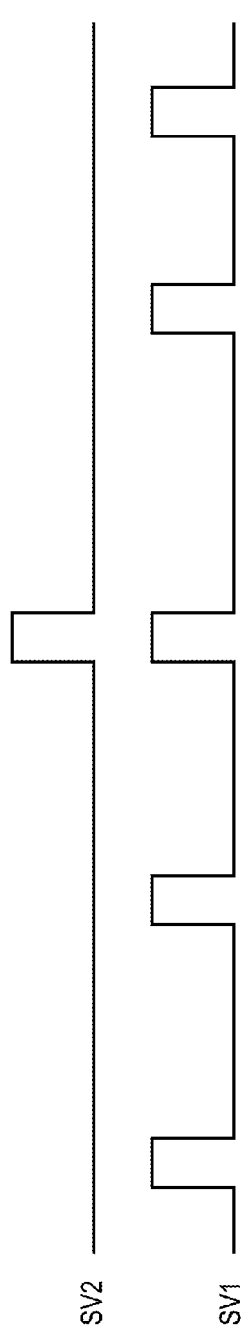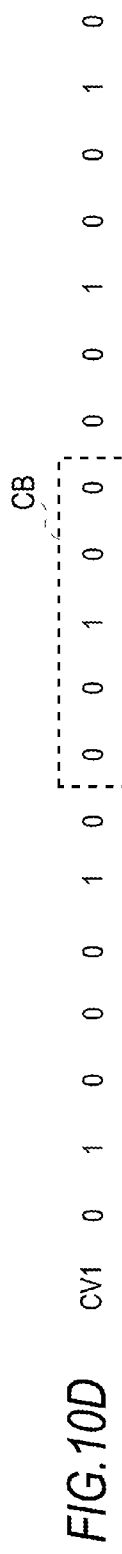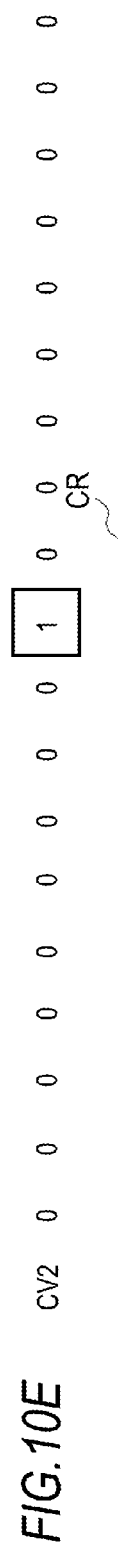

SIGNAL PROCESSING PROCEDURE

LIGHT RECEIVING SIGNAL IN SECOND EMBODIMENT
FIG.12A
RECORDING CODE
0  1  1  1  1  0  0  0  1  1  0  0  0  0  1  1  1  0  0
FIG.12B
IDEAL RECORDING MARK
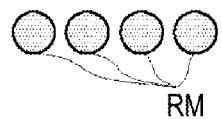
RM
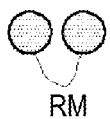
RM
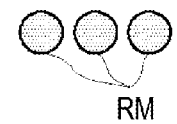
RM
FIG.12C
FUSED RECORDING MARKS
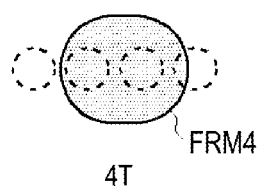
FRM4
4T
2T
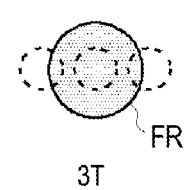
FRM3
3T
FIG.12D
LIGHT RECEIVING SIGNAL
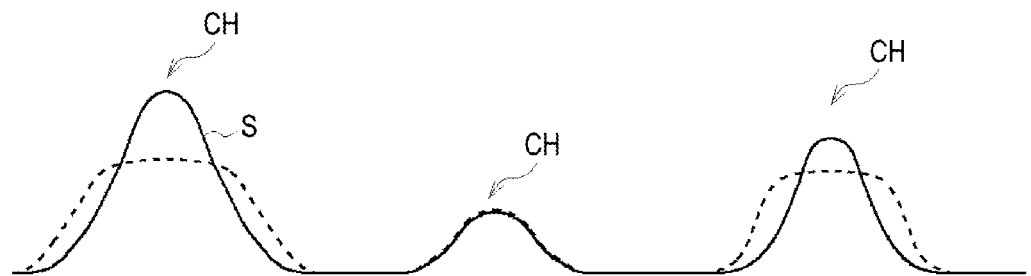

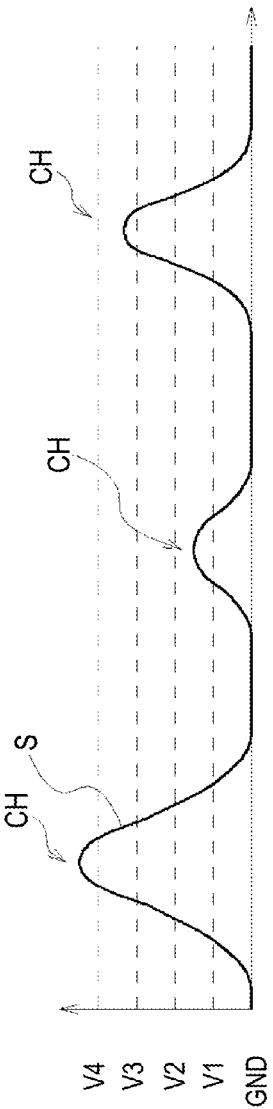

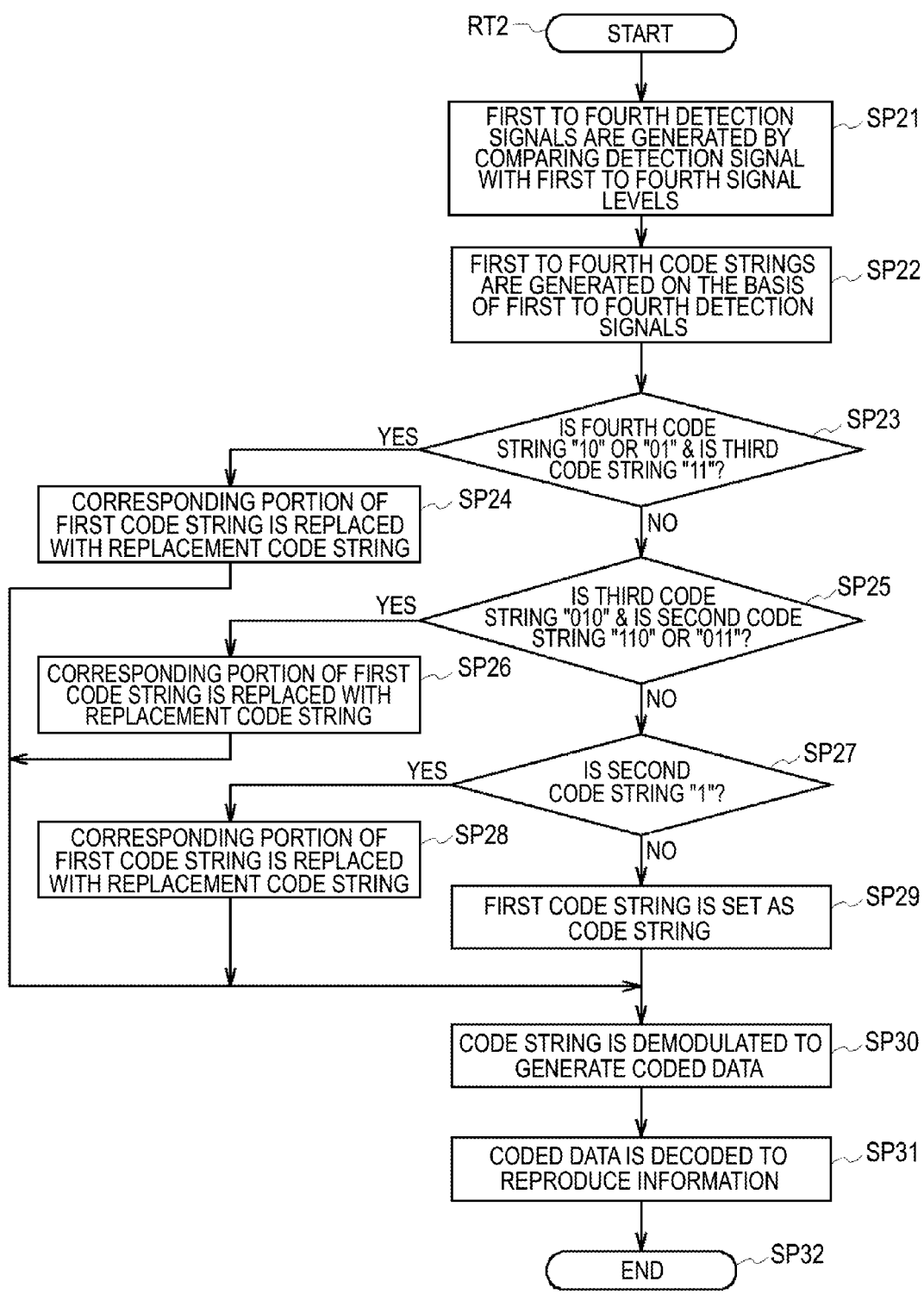

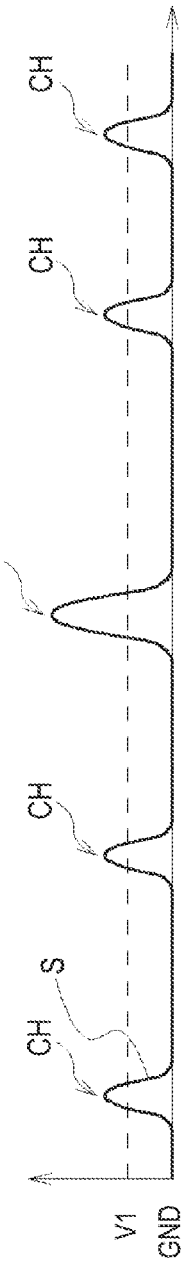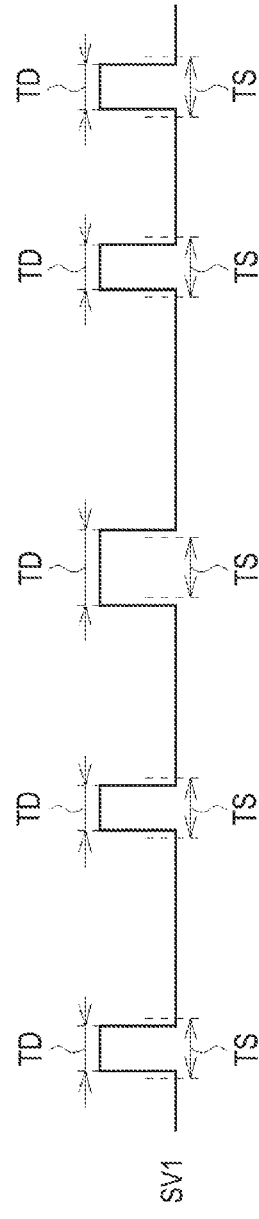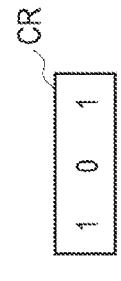

SIGNAL PROCESSING PROCEDURE

OPTICAL INFORMATION REPRODUCING APPARATUS AND OPTICAL INFORMATION REPRODUCING METHOD

BACKGROUND OF THE INVENTION

1. Field of the Invention

The present invention relates to an optical information reproducing apparatus and an optical information reproducing method, and is suitably applied to an optical information reproducing apparatus which reproduces information from optical information recording media, such as an optical disk.

2. Description of the Related Art

Known optical information reproducing apparatuses that reproduce information by irradiating a light beam onto optical information recording media including optical disks, such as a BD (Blu-ray disc; registered trademark), and reading the reflected light have been widely spread.

In addition, an increase in the storage capacity of optical information recording media has been demanded in recent years. For this reason, in an optical information recording medium and an optical information reproducing apparatus, a technique of increasing the density of recording marks formed on the optical information recording medium by shortening the wavelength of the light beam so that the beam spot becomes minute, a technique of forming multiple recording layers, and the like are used.

Moreover, a method of recording the information by forming a recording mark as a hole in the recording medium, such as an optical disk, using two-photon absorption response, for example, and of reproducing the information by irradiating a light beam onto the bubble and reading the reflected light was also proposed (for example, refer to JP-A-2005-37658 (pages 9 and 10)).

That is, when recording the information, an optical information recording/reproducing apparatus 1 shown in FIG. 1 irradiates a relatively strong light beam L1 corresponding to a code string, which is formed by encoding the information to be recorded, while changing the relative positions of an optical information recording medium 100 and an optical pickup 2.

In this case, the optical pickup 2 emits the light beams L1 from a laser 3, converts the light beams L1 into parallel beams by a collimator lens 4, makes some of the light beams L1 pass through a beam splitter 5, and condenses them on the optical information recording medium 100 by an objective lens 6.

As a result, for example, as shown in FIG. 2, bubbles are generated and recording marks RM which are holes are sequentially formed on the optical information recording medium 100.

In addition, when reproducing the information, the optical information recording/reproducing apparatus 1 irradiates the light beam. L1, which is weaker than at the time of recording, onto the optical information recording medium 100. Then, the light beam L1 is reflected by the recording mark RM, and as a result, a reflected light beam L2 is generated.

The optical information recording/reproducing apparatus 1 converts the reflected light beams L2 into parallel beams by the objective lens 6, reflects some of the light beams L2 by the beam splitter 5, condenses them by a condensing lens 7, and receives them by a light receiving element 8. As a result, a light receiving signal S is generated.

Then, the optical information recording/reproducing apparatus 1 reproduces the information by performing predetermined demodulation processing, decoding processing, and the like after recognizing the existence, arrangement, and the like of the recording marks RM on the basis of the light receiving signal S using a signal processor (not shown).

SUMMARY OF THE INVENTION

On the other hand, the information is correctly recorded on the optical information recording medium when light beams are condensed at the proper positions and bubbles are formed by operation of the light beams or heat to thereby form the recording marks RM.

Here, the case is assumed in which the plurality of recording marks RM are continuously formed at the relatively adjacent locations. For example, when recording a code string "01010" shown in FIG. 3A on the optical information recording medium 100, a state where the recording mark RM which is a bubble is formed at each position corresponding to a code "1" as shown in FIG. 3B is an ideal state.

In the actual optical information recording medium 100, however, there is a case where when a first bubble forming location melts to form a bubble (FIG. 3C), and a peripheral portion in a second bubble forming location melts while having fluidity (FIG. 3D), both the melted areas are fused (FIG. 3E).

As a result, on the optical information recording medium 100, vaporized areas are also fused within the melted area and only one bubble, which is relatively large and has a shape of an approximately true sphere, is formed near the middle of the melted area by an action, such as surface tension (FIG. 3F). This may be said to be a state where the information is not correctly recorded on the optical information recording medium 100.

In this case, the optical information recording/reproducing apparatus 1 generates an erroneous code string, such as "00100" or "01110", instead of a code string "01010" corresponding to the original information, from the optical information recording medium 100 in which the bubbles shown in FIG. 3F are formed.

For this reason, there has been a problem that the optical information recording/reproducing apparatus 1 reproduces incorrect information on the basis of an erroneous code string and as a result, it is difficult to correctly reproduce the information to be originally recorded.

Thus, it is desirable to propose an optical information reproducing apparatus and an optical information reproducing method capable of correctly reproducing the information to be originally recorded.

According to an embodiment of the present invention, a light beam is irradiated onto an optical information recording medium, in which holes are formed along a virtual track in a recording medium, along the virtual track according to encoded information, a reflected light beam when the light beam is reflected by the optical information recording medium is received, and a light receiving signal corresponding to the light intensity is sequentially generated. A variation pattern appearing when the signal level of the light receiving signal changes according to the hole is detected. When generating a code string corresponding to the signal level of the light receiving signal, a code corresponding to the one hole is generated from the variation pattern if the variation pattern falls within a predetermined range and a predetermined code string, which includes a plurality of codes, is generated from the variation pattern if the variation pattern exceeds the predetermined range.

In this case, even when a plurality of holes which should be separately formed originally are fused and only one variation pattern appears in the light receiving signal accordingly, it is possible to check that the variation pattern is a pattern formed by the fused holes. As a result, a code string corresponding to the plurality of original holes can be generated. Moreover, in this case, even when a hole which should be formed in a predetermined length originally is shortened and the variation period of a variation pattern in the light receiving signal decreases accordingly, it is possible to check that the variation pattern is a pattern formed by the shortened hole. As a result, a code string corresponding to the length of the original hole can be generated.

According to the embodiment of the present invention, even when a plurality of holes which should be separately formed originally are fused and only one variation pattern appears in a light receiving signal accordingly, it is possible to check that the variation pattern is a pattern formed by the fused holes. As a result, a code string corresponding to the plurality of original holes can be generated. In addition, according to the embodiment of the present invention, even when a hole which should be formed in a predetermined length originally is shortened and the variation period of a variation pattern in a light receiving signal becomes short accordingly, it is possible to check that the variation pattern is a pattern formed by the shortened hole. As a result, a code string corresponding to the length of the original hole can be generated. In this way, it is possible to realize an optical information reproducing apparatus and an optical information reproducing method capable of correctly reproducing the information to be originally recorded.

BRIEF DESCRIPTION OF THE DRAWINGS

FIGS. 8A to 8C are schematic views presented to explain the mark length dependence;

FIGS. 9A to 9C are schematic views showing a light receiving signal in a first embodiment;

FIGS. 10A to 10G are schematic views showing the generation of a code string in the first embodiment;

FIGS. 12A to 12D are schematic views showing a light receiving signal in a second embodiment;

FIGS. 13A to 13K are schematic views showing the generation of a code string in the second embodiment;

FIG. 14 is a flow chart showing a signal processing procedure;

FIGS. 15A to 15E are schematic views showing the generation of a code string in a third embodiment.

DESCRIPTION OF THE PREFERRED EMBODIMENTS

Hereinafter, modes for carrying out the invention (hereinafter, referred to as embodiments) will be described with reference to the accompanying drawings. In addition, the explanation will be given in following order.

Figure 4:
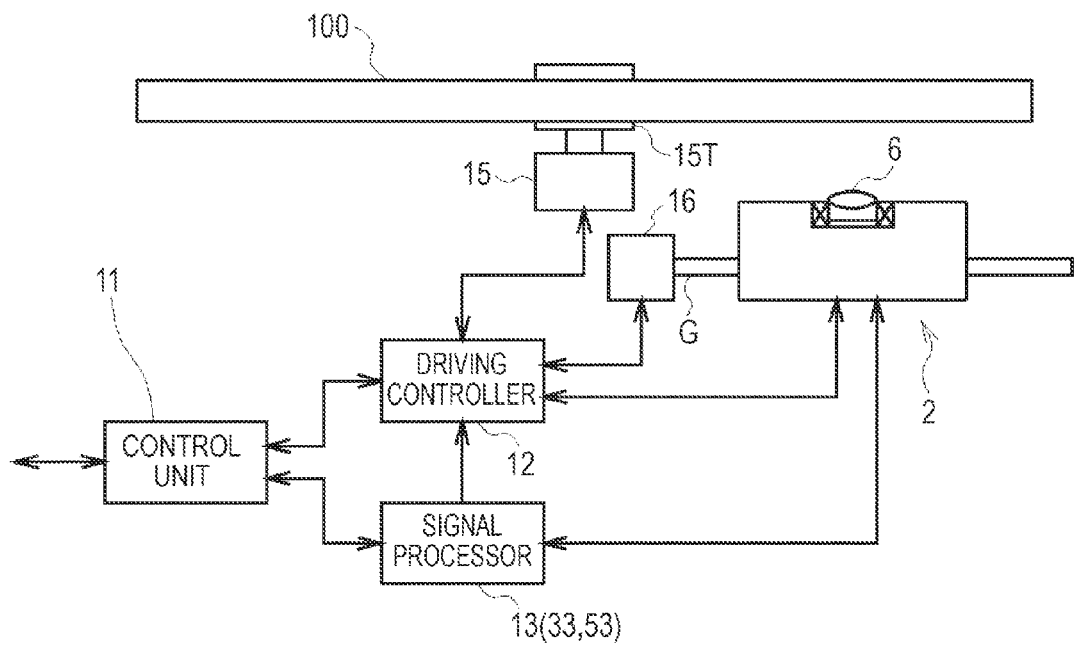
FIG. 4 is a schematic view showing the entire configuration of an optical information reproducing apparatus.

1. First embodiment (mark position recording method, example of using a peak level)
2. Second embodiment (mark length recording method, example of using a peak level)
3. Third embodiment (mark length recording method, example of using a peak period)
4. Other embodiments 1. First Embodiment 1-1. Configuration of an Optical Information Reproducing Apparatus An optical information reproducing apparatus 10 shown in FIG. 4 is configured to irradiate a light beam L1 onto an optical information recording medium 100 in which information is recorded, receive a reflected light beam L2 obtained as a result of the irradiation, and reproduce the information recorded on the optical information recording medium 100 on the basis of the light receiving result.

Figure 2:
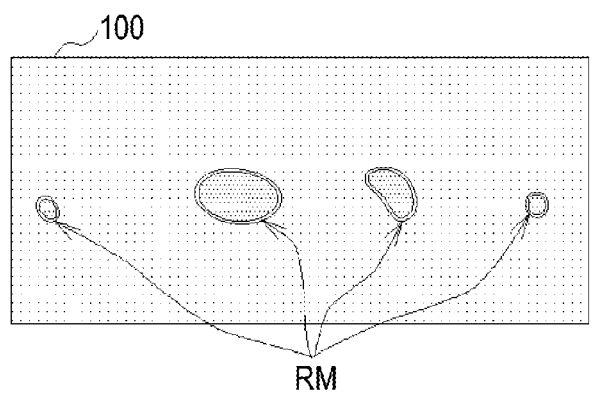
FIG. 2 is a schematic view presented to explain the formation of bubbles.
Figure 3A:
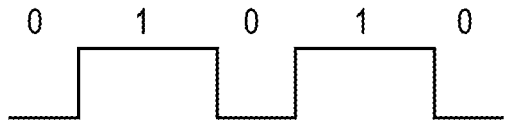
FIGS. 3A to 3F are schematic views presented to explain the formation of a recording mark by bubbles.
Figure 3B:
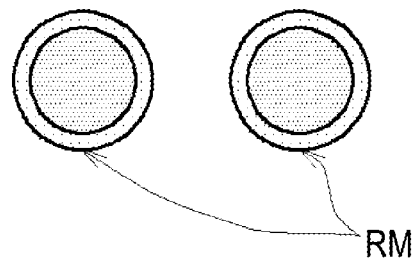
Figure 3C:
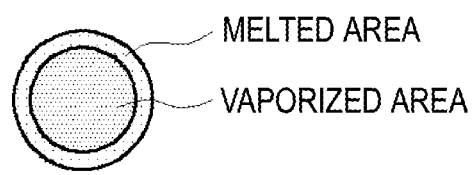
Figure 3D:
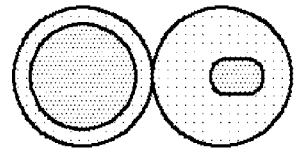
Figure 3E:
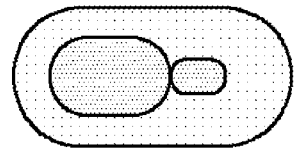
Figure 3F:
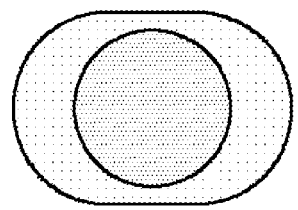

The optical information recording medium 100 has an approximately disk shape as a whole. Moreover, on the optical information recording medium 100, bubbles are generated by two-photon absorption response or the like when light beams are condensed on an almost uniform recording medium, and the recording mark RM (FIG. 2) as a hole is formed. In addition, on the optical information recording medium 100, bubbles are arrayed along a virtual track with an approximately spiral shape corresponding to a code string generated by encoding the information.

The optical information reproducing apparatus 10 has a control unit 11 as a main component. The control unit 11 is configured to include a CPU (Central Processing Unit), a ROM (Read Only Memory) in which various programs and the like are stored, and a RAM (Random Access Memory) used as a work area and the like of the CPU, all of which are not shown in the drawings.

When a reproduction instruction is received from an external device (not shown), the control unit 11 makes a driving controller 12 drive a spindle motor 15 to rotate so that the optical information recording medium 100 mounted on a turntable 15T rotates at a desired speed.

In addition, the control unit 11 controls the driving controller 12 to drive a thread motor 16 so that an optical pickup 2 is largely moved in the tracking direction along a moving shaft G, that is, in a direction toward the inner or outer peripheral side of the optical information recording medium 100.

Figure 1:
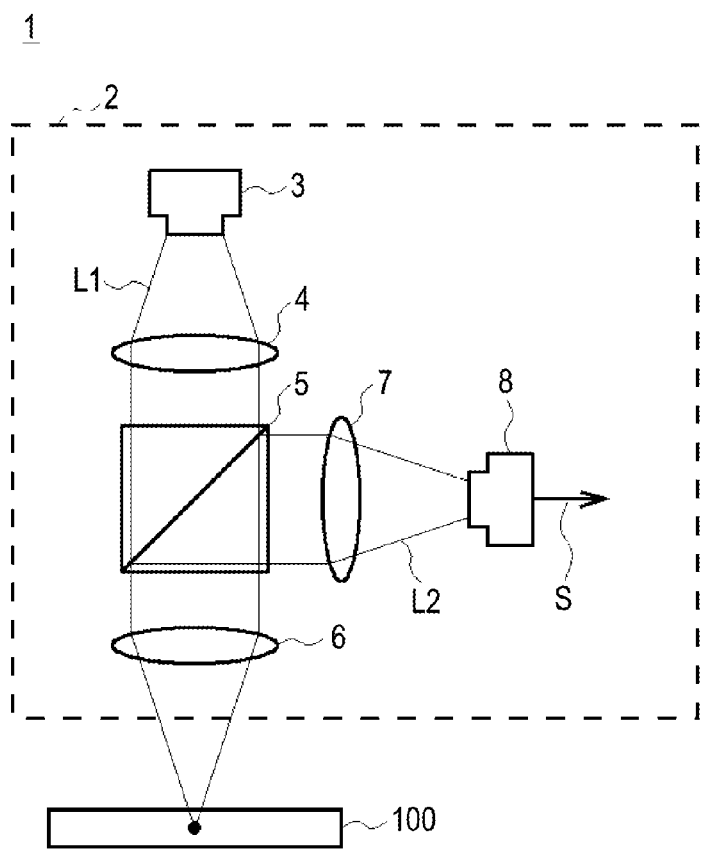
FIG. 1 is a schematic view showing the configuration of an optical information recording/reproducing apparatus.

The optical pickup 2 has a plurality of optical components assembled as shown in FIG. 1. Under the control of the control unit 11, the optical pickup 2 emits light beams L1 from a laser 3, condenses the light beams L1 by an objective lens 6, and irradiates the light beams L1 onto the optical information recording medium 100.

In addition, the optical pickup 2 generates a detection signal S by detecting a reflected light beam L2, which is obtained by reflection of the light beam L1 from the optical information recording medium 100, and supplies the detection signal S to a signal processor 13. The detection signal S is equivalent to a so-called reproduction RF signal and has a signal level corresponding to the light intensity of the reflected light beam L2.

The signal processor 13 has a CPU, a ROM, and a RAM (not shown) similar to the control unit 11 and performs various kinds of signal processing according to a predetermined signal processing program. In practice, the signal processor 13 reproduces the information, which is recorded as the recording mark RM, by performing predetermined signal processing on the detection signal S (this will be described later in detail).

Figure 5:
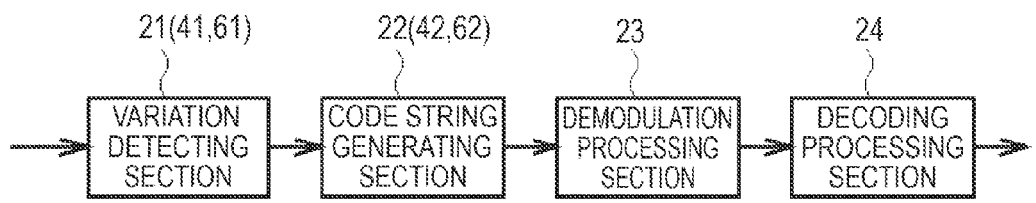
FIG. 5 is a schematic view showing the configuration of a signal processor.

By executing the signal processing program described above, the signal processor 13 may realize a plurality of functional blocks as shown in FIG. 5.

A variation detecting section 21 detects a variation suitable for a predetermined variation pattern on the basis of the detection signal S and supplies the detection result to a code string generating section 22. The code string generating section 22 generates a code string C sequentially according to the detection result of the variation detecting section 21 and supplies it to a demodulation processing section 23.

The demodulation processing section 23 generates coded data D by performing predetermined demodulation processing on the code string C and supplies it to a decoding processing section 24. The decoding processing section 24 reproduces the information, which is recorded on the optical information recording medium 100, by performing predetermined decoding processing on the coded data D and sends it to an external device (not shown) through the control unit 11.

Thus, the optical information reproducing apparatus 10 generates the detection signal S corresponding to the light intensity of the reflected light beam L2 obtained from the optical information recording medium 100, generates the code string C on the basis of a variation pattern of the detection signal S, and finally reproduces the information.

1-2. Information Recording Method and Formation of a Mark

In general, when recording information on the optical information recording medium 100, the information is converted into a binary code which has a value "0" or "1", for example, by performing predetermined encoding processing or modulation processing on the information and the binary code is matched with the existence of the recording mark RM (FIG. 1).

Here, as a method of recording a code string of binary codes in an optical information recording medium, a mark position recording method corresponding to RZ (Return to Zero) codes, a mark length recording method corresponding to NRZI (Non Return to Zero Invert) codes, and the like are known.

Figure 6A:
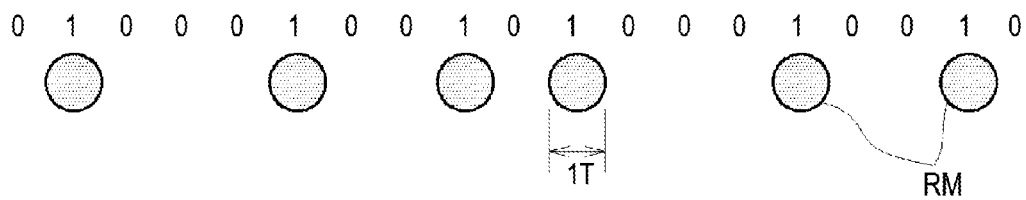
FIGS. 6A and 6B are schematic views presented to explain two types of recording methods.

In the mark position recording method, for example, in the case of 1-7 modulation, one to seven continuous codes "0" and one code "1" appear alternately as shown in FIG. 6A. In this case, the recording mark RM is formed at the place corresponding to the code "1" on the optical information recording medium 100.

Figure 6B:
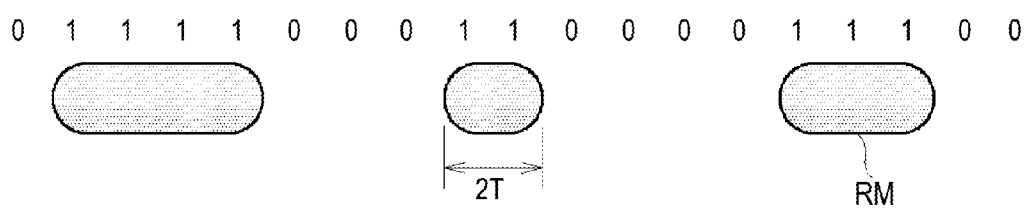

On the other hand, in the mark length recording method, in the same case of 1-7 modulation, for example, two to eight continuous codes "0" and two to eight continuous codes "1" appear alternately as shown in FIG. 6B. Also in this case, the recording mark RM is formed at the place corresponding to the code "1" on the optical information recording medium 100.

Specifically, recording marks RM2, RM3, and RM4 with lengths corresponding to so-called 2T, 3T, and 4T are respectively formed corresponding to code strings "11", "111", and "1111".

Figure 7A:
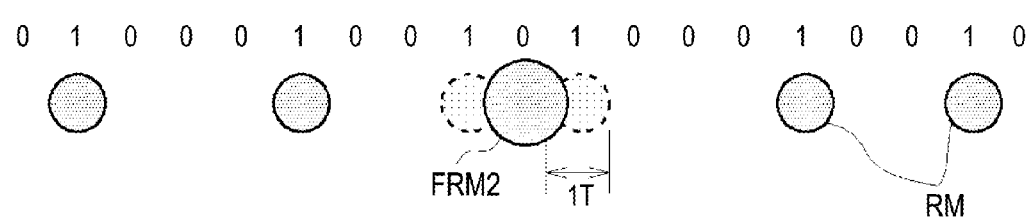
FIGS. 7A and 7B are schematic views presented to explain the fusion and deformation of a recording mark.

Here, as shown in FIGS. 3C to 3F, the case is assumed in which the recording marks RM, which are positioned to be relatively adjacent to each other, are fused. In the mark position recording method, there is a possibility that a fused recording mark FRM2, which is relatively large, will be formed at the place of a code "0" in the middle of the code string "101", as shown in FIG. 7A corresponding to FIG. 6A.

Figure 7B:
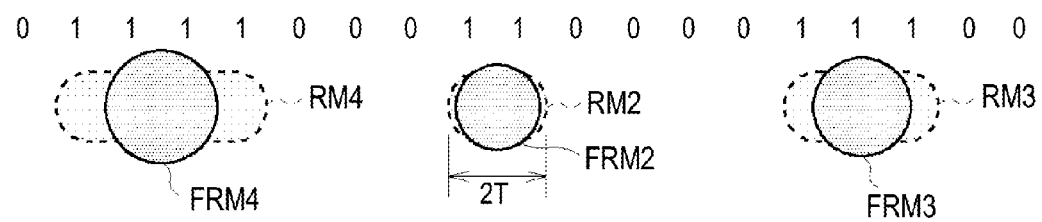

Moreover, in the mark length recording method, there is a possibility that fused recording marks FRM2, FRM3, and FRM4, which are relatively large, will be formed near middle portions of the code strings "11", "111", and "1111" as shown in FIG. 7B corresponding to FIG. 6B.

Then, the reproduction RF signal when the code string "11", that is, the recording mark RM2 of so-called 2T was repeatedly recorded actually on the optical information recording medium 100 was measured and the test result shown in FIG. 8A was obtained.

Similarly, the reproduction RF signal when the code strings "111" and "1111", that is, the recording mark RM3 of 3T and the recording mark RM4 of 4T were repeatedly recorded on the optical information recording medium 100 was measured and the test result shown in FIGS. 8B and 8C was obtained.

Here, if the ideal recording marks RM2, RM3, and RM4 are formed on the optical information recording medium 100 as shown in FIG. 6B, it is expected that the high-level section in the reproduction RF signal will become longer as the number of continuous codes "1" increases.

However, if they are compared with actual waveforms (FIGS. 8A to 8C), it can be seen that as the number of continuous codes "1" increases, the time length in the high-level section does not change largely in proportion to the increase, but the peak level increases gradually.

In this case, it is thought that not the recording marks RM2, RM3, and RM4 but the fused recording marks FRM2, FRM3, and FRM4 are formed on the optical information recording medium 100.

Thus, it has been shown that the fused recording marks FRM2, FRM3, FRM4, and the like may be formed on the optical information recording medium 100 instead of the recording marks RM2, RM3, RM4, and the like when the recording marks RM are formed at the relatively adjacent places.

This shows that the original information may not be reproduced correctly even if the code "0" or "1" is directly generated according to the signal level in a reproduction RF signal.

1-3. Generation of a Code String

Next, it will be described how the signal processor 13 of the optical information reproducing apparatus 10 generates the code string C on the basis of such a reproduction RF signal (that is, the light receiving signal S).

The information is recorded on the optical information recording medium 100 by forming each recording mark RM by the mark position recording method, as shown in FIGS. 9A and 9B corresponding to FIG. 7A. In addition, the optical information recording medium 100 is configured such that a minimum gap (so-called minimum run) between codes "1" is "1" and at least one or more codes "0" appear between the codes "1".

Here, the light receiving signal S acquired from the optical pickup 2 of the optical information reproducing apparatus 10 becomes a signal waveform shown in FIG. 9C if expressed corresponding to each recording mark RM in FIG. 9B.

As can be seen from FIG. 9C, when the fused recording mark FRM2 is formed, a variation pattern CH corresponding to the fused recording mark FRM2 has a higher peak level than a variation pattern CH corresponding to the normal recording mark RM.

Then, first, the variation detecting section 21 (FIG. 5) of the signal processor 13 determines whether or not the light receiving signal S exceeds a first signal level V1 and a second signal level V2 with a reference signal level equivalent to GND as a reference, as shown in FIG. 10A.

In addition, the first signal level V1 is set on the basis of a previous test result or the like so as to be lower than the peak level of the variation pattern CH corresponding to the normal recording mark RM and to be higher than the peak level occurring by noise or the like. Similarly, the second signal level V2 is also set on the basis of a previous test result or the like so as to be higher than the peak level of the variation pattern CH corresponding to the normal recording mark RM and to be lower than the peak level of the variation pattern CH corresponding to the fused recording mark FRM2.

Then, as shown in FIG. 10C, the variation detecting section 21 generates a first detection signal SV1, which has a high level in a section where the light receiving signal S exceeds the first signal level V1 and has a low level in the remaining section, and supplies the first detection signal SV1 to the code string generating section 22 (FIG. 5).

In addition, as shown in FIG. 10B, the variation detecting section 21 generates a second detection signal SV2, which has a high level in a section where the light receiving signal S exceeds the second signal level V2 and has a low level in the remaining section, and supplies the second detection signal SV2 to the code string generating section 22.

The code string generating section 22 generates a first code string CV1 by converting a low-level place and a high-level place in the first detection signal SV1 into the values "0" and "1", respectively, as shown in FIG. 10E.

In addition, the code string generating section 22 generates a second code string CV2 by converting a low-level place and a high-level place in the second detection signal SV2 into the values "0" and "1", respectively, as shown in FIG. 10D.

In addition, the code string generating section 22 is configured to generate codes of the first and second code strings CV1 and CV2 at the timing matched with a clock signal with a predetermined period which is synchronized with a rising edge of the first detection signal SV1, for example.

Here, if the first code string CV1 is the value "1", the code string generating section 22 sets the value "1" as a final code, in principle. In addition, if the second code string CV2 is the value "1", the code string generating section 22 determines that the fused recording mark FRM2 is formed at the location, in which the two recording marks RM should be separately formed originally, and replaces it with a code string corresponding to the two recording marks RM to be originally formed.

That is, if the peak level of the variation pattern CH is equal to or larger than the first signal level V1 and smaller than the second signal level V2, the code string generating section 22 determines that the variation pattern CH is a pattern generated by the normal recording mark RM. In addition, if the peak level of the variation pattern CH is equal to or larger than the second signal level V2, the code string generating section 22 determines that the variation pattern CH is a pattern generated by the fused recording mark FRM2.

Specifically, the code string generating section 22 replaces a code string CB (indicated by a dotted line in the drawing), which includes five continuous codes in the first code string CV1 with a place (portion surrounded by a solid line in the drawing) of the value "1" in the second code string CV2 as the middle, with a replacement code string CR shown in FIG. 10F. As a result, the code string generating section 22 generates the code string C shown in FIG. 10G.

Thus, the code string generating section 22 can generate the code string C corresponding to the plurality of recording marks RM, which should be originally recorded, from the location in which the fused recording mark FRM2 is actually formed on the optical information recording medium 100.

Then, the code string generating section 22 supplies the generated code string C to the demodulation processing section 23 (FIG. 5).

1-4. Signal Processing Procedure

Figure 11:
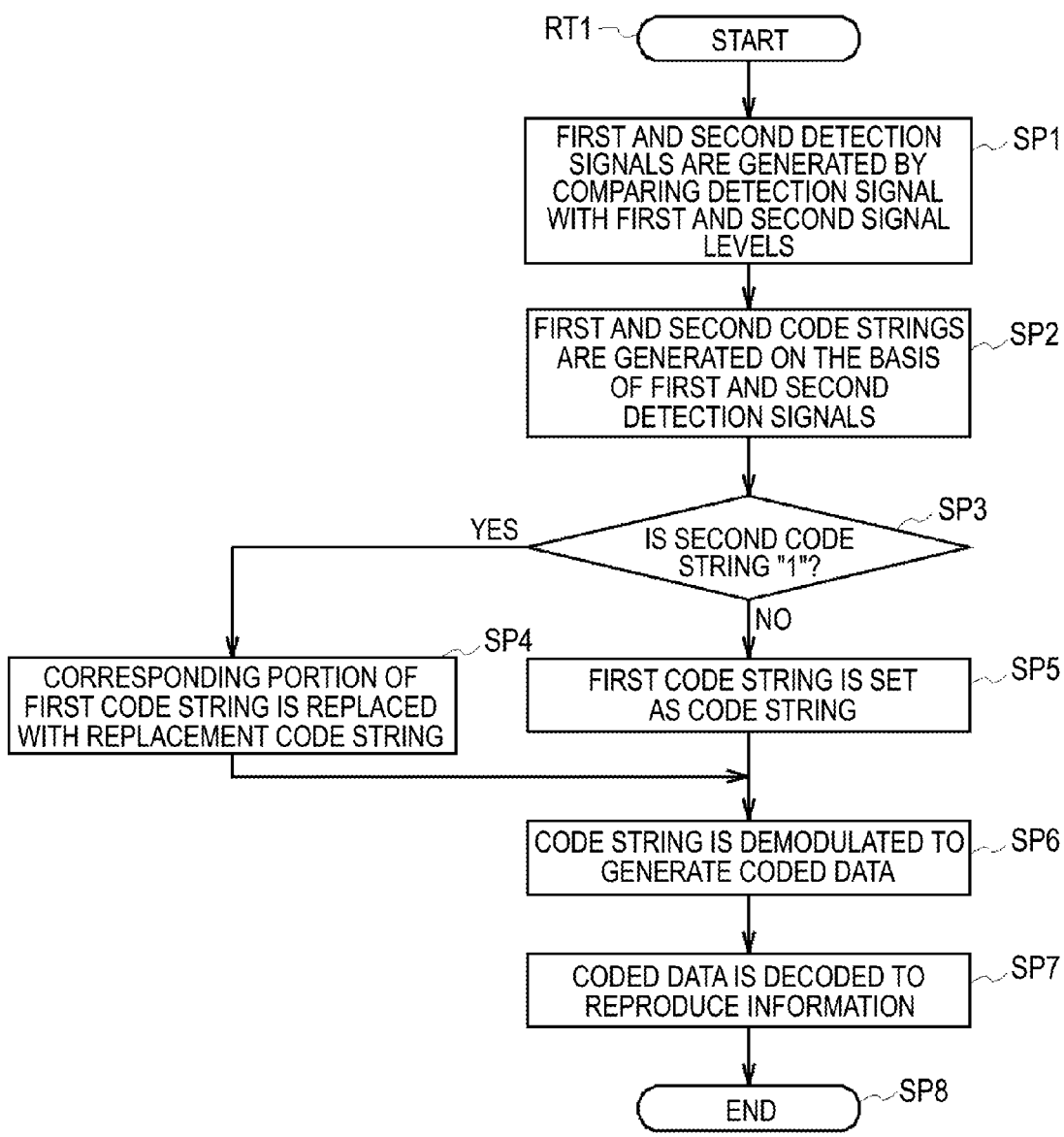
FIG. 11 is a flow chart showing a signal processing procedure.

In practice, the signal processor 13 executes a series of signal processing including the above-described processing of generating a code string according to a signal processing procedure RT1 shown in FIG. 11. When a reproduction instruction of the optical information recording medium 100 is given, the signal processor 13 starts the signal processing procedure RT1 and moves to step SP1.

In step SP1, the variation detecting section 21 of the signal processor 13 compares the detection signal S with the first and second signal levels V1 and V2, and generates the first and second detection signals SV1 and SV2 (FIGS. 10B and 10C) on the basis of the comparison result. Then, the process moves to next step SP2.

In step SP2, the code string generating section 22 of the signal processor 13 generates the first and second code strings CV1 and CV2 (FIGS. 10D and 10E) on the basis of the first and second detection signals SV1 and SV2. Then, the process moves to next step SP3.

In step SP3, the code string generating section 22 of the signal processor 13 determines whether or not the code of the second code string CV2 is the value "1". Obtaining a positive result in step SP3 indicates that the fused recording mark FRM2 is presumably formed since the peak level in the variation pattern CH is equal to or larger than the second signal level V2. In this case, the signal processor 13 moves to next step SP4.

In step SP4, the code string generating section 22 of the signal processor 13 replaces a portion (code string CB) in the first code string CV1, which corresponds to the value "1" of the second code string, with the replacement code string CR (FIG. 10F). In this case, the code string generating section 22 generates the code string C (FIG. 10G) and supplies the code string C to the demodulation processing section 23. Then, the process moves to next step SP6.

On the other hand, obtaining a negative result in step SP3 indicates that it is not necessary to replace a code string since the fused recording mark FRM2 is not formed. In this case, the signal processor 13 moves to next step SP5.

In step SP5, the signal processor 13 supplies the first code string CV1 to the demodulation processing section 23 as the code string C. Then, the process moves to next step SP6.

In step SP6, the signal processor 13 generates the coded data D by performing predetermined decoding processing on the code string C using the demodulation processing section 23 and supplies the coded data D to the decoding processing section 24. Then, the process moves to next step SP7.

In step SP7, the signal processor 13 reproduces the information, which is recorded on the optical information recording medium 100, by performing predetermined decoding processing on the coded data D using the decoding processing section 24 and supplies the reproduced information to the control unit 11. Thereafter, the signal processor 13 moves to next step SP8 and the signal processing procedure RT1 ends.

In addition, the signal processor 13 is configured to sequentially reproduce the information on the basis of the detection signal S by repeatedly executing the signal processing procedure RT1.

1-5. Operations and Effects

In the above configuration, the optical information reproducing apparatus 10 generates the light receiving signal S by irradiating the light beam L1 onto the optical information recording medium 100 and receiving the reflected light beam L2 obtained from the optical information recording medium 100 as a result of the irradiation.

The signal processor 13 of the optical information reproducing apparatus 10 generates the first and second detection signals SV1 and SV2 by comparing the detection signal S with the first and second signal levels V1 and V2, respectively, using the variation detecting section 21.

In addition, the code string generating section 22 of the signal processor 13 converts the first and second detection signals SV1 and SV2 into the first and second code strings CV1 and CV2, respectively. In this case, when the second code string CV2 is the value "1", the code string generating section 22 replaces the neighboring code string CB in the first code string CV1 with the replacement code string CR and sets it as the code string C.

Then, the signal processor 13 generates the coded data D on the basis of the code string C using the demodulation processing section 23 and reproduces the information on the basis of the coded data D using the decoding processing section 24.

Accordingly, even if two recording marks RM which are adjacent to each other within the optical information recording medium 100 are fused to form the fused recording mark FRM2, the optical information reproducing apparatus 10 can generate the code string C equivalent to the two recording marks RM to be originally recorded.

That is, since the optical information reproducing apparatus 10 can restore the same code string C as in the case where the right recording mark RM is formed even when the right recording mark RM is not formed on the optical information recording medium 100, the optical information reproducing apparatus 10 can eventually reproduce the information equivalent to the original information.

In this case, the code string generating section 22 of the signal processor 13 can check that the peak level in the variation pattern CH exceeds the second signal level V2, that is, the existence of the fused recording mark FRM2 on the basis of the appearance of the code "1" in the second code string CV2.

In other words, although the first code string CV1 based on the first signal level L1 is set as the final code string C in a normal code generation process, the signal processor 13 can obtain a code string to be originally recorded by performing appropriate correction using the second code string CV2 based on the second signal level together.

Moreover, in the signal processor 13, simple processing of "adding one signal level V to be compared with the detection signal S and replacing some of the code string as necessary" may only be added compared with the general signal processing. Accordingly, an increase in the processing load can be greatly suppressed.

On the other hand, on the optical information recording medium 100, the codes "1" are not continuously located in order to set the minimum run to 1 in the mark position recording method. By using such a code appearance rule, the optical information reproducing apparatus 10 can recognize that the location, at which the fused recording mark FRM2 is formed, is a location where the two recording marks RM corresponding to a code string "101" should be originally recorded. As a result, the optical information reproducing apparatus 10 can correctly restore the code string C equivalent to the code string to be originally recorded.

According to the above configuration, the optical information reproducing apparatus 10 generates the first and second detection signals SV1 and SV2 by comparing the detection signal S with the first and second signal levels V1 and V2, respectively, using the variation detecting section 21 of the signal processor 13. In addition, the code string generating section 22 of the signal processor 13 converts the first and second detection signals SV1 and SV2 into the first and second code strings CV1 and CV2, respectively. When the second code string CV2 is the value "1", the code string generating section 22 of the signal processor 13 replaces the neighboring code string CB in the first code string CV1 with the replacement code string CR and sets it as the code string C. Accordingly, the optical information reproducing apparatus 10 can generate the code string C equivalent to the two recording marks RM, which should be originally recorded, even if the fused recording mark FRM2 is formed on the optical information recording medium 100.

2. Second Embodiment 2-1. Configuration of an Optical Information Reproducing Apparatus and an Information Recording Method An optical information reproducing apparatus 30 (FIG. 4) according to a second embodiment has the same configuration as the optical information reproducing apparatus 10 according to the first embodiment except that a signal processor 33 is provided instead of the signal processor 13.

The signal processor 33 (FIG. 5) has the same configuration as the signal processor 13 except that a variation detecting section 41 and a code string generating section 42 are provided instead of the variation detecting section 21 and the code string generating section 22.

In the second embodiment, the information is recorded on the optical information recording medium 100 by forming each recording mark RM by the mark length recording method, as shown in FIGS. 12A and 12B corresponding to FIG. 6B. In addition, the shortest mark length is set to "2", such that at least two or more same codes are continuously recorded.

Moreover, in the second embodiment, each recording mark RM is independently formed so that ideally, marks are separated from each other within the optical information recording medium 100 in order not to form a large recording mark, as shown in FIG. 12B. However, as shown in FIG. 12C, the fused recording mark FRM3 or FRM4 may be formed on the optical information recording medium 100 by fusion of the plurality of recording marks RM.

Here, the light receiving signal S acquired from the optical pickup 2 of the optical information reproducing apparatus 30 becomes a signal waveform shown in FIG. 12D if expressed corresponding to each recording mark RM in FIG. 12C.

As can be seen from FIG. 12D, a variation pattern CH corresponding to the fused recording mark FRM3 has a high peak level and the width of a peak portion is small, compared with a variation pattern CH (indicated by a dotted line in the drawing) corresponding to the normal recording mark RM.

In addition, a variation pattern CH corresponding to the fused recording mark FRM4 also has a high peak level and the width (that is, a period) of a peak portion is small, compared with the variation pattern CH (indicated by a dotted line in the drawing) corresponding to the normal recording mark RM.

2-2. Generation of a Code String

First, the variation detecting section 41 (FIG. 5) of the signal processor 33 determines whether or not the light receiving signal S exceeds a first signal level V1, a second signal level V2, a third signal level V3, and a fourth signal level V4 with GND as a reference, as shown in FIG. 13A.

In addition, both the first and second signal levels V1 and V2 are set as the same values as in the first embodiment. The third signal level V3 is set on the basis of a previous test result or the like so as to be higher than the peak level of the variation pattern CH corresponding to the fused recording mark FRM2 and to be lower than the peak level of the variation pattern CH corresponding to the fused recording mark FRM3. Similarly, the fourth signal level V4 is set on the basis of a previous test result or the like so as to be higher than the peak level of the variation pattern CH corresponding to the fused recording mark FRM3 and to be lower than the peak level of the variation pattern CH corresponding to the fused recording mark FRM4.

Then, as shown in FIG. 13E, the variation detecting section 41 generates a first detection signal SV1, which has a high level in a section where the light receiving signal S exceeds the first signal level V1 and has a low level in the remaining section, and supplies the first detection signal SV1 to the code string generating section 42 (FIG. 5).

In addition, as shown in FIG. 13D, the variation detecting section 41 generates a second detection signal SV2, which has a high level in a section where the light receiving signal S exceeds the second signal level V2 and has a low level in the remaining section, and supplies the second detection signal SV2 to the code string generating section 42.

In addition, as shown in FIG. 13C, the variation detecting section 41 generates a third detection signal SV3, which has a high level in a section where the light receiving signal S exceeds the third signal level V3 and has a low level in the remaining section, and supplies the third detection signal SV3 to the code string generating section 42.

In addition, as shown in FIG. 13B, the variation detecting section 41 generates a fourth detection signal SV4, which has a high level in a section where the light receiving signal S exceeds the fourth signal level V4 and has a low level in the remaining section, and supplies the fourth detection signal SV4 to the code string generating section 42.

The code string generating section 42 generates a first code string CV1 by converting a low-level place and a high-level place in the first detection signal SV1 into the values "0" and "1", respectively, as shown in FIG. 10I.

In addition, the code string generating section 42 generates a second code string CV2 by converting a low-level place and a high-level place in the second detection signal SV2 into the values "0" and "1", respectively, as shown in FIG. 10H.

In addition, the code string generating section 42 generates a third code string CV3 by converting a low-level place and a high-level place in the third detection signal SV3 into the values "0" and "1", respectively, as shown in FIG. 10G.

In addition, the code string generating section 42 generates a fourth code string CV4 by converting a low-level place and a high-level place in the fourth detection signal SV4 into the values "0" and "1", respectively, as shown in FIG. 10F.

Similar to the code string generating section 22, if the first code string CV1 is the value "1", the code string generating section 42 sets the value "1" as a final code, in principle.

That is, if the peak level of the variation pattern CH is equal to or larger than the first signal level V1 and smaller than the second signal level V2, the code string generating section 42 determines at once that the variation pattern CH is a pattern generated by the normal recording mark RM.

On the other hand, if the second code string CV2 is the value "1", the code string generating section 42 determines that the fused recording mark FRM2 is formed at the location, in which the two recording marks RM should be originally formed, and replaces it with a code string corresponding to the two recording marks RM to be originally formed.

That is, if the peak level of the variation pattern CH is equal to or larger than the second signal level V2 and smaller than the third signal level V3, the code string generating section 42 determines that the variation pattern CH is a pattern generated by the fused recording mark FRM2.

In addition, if the third code string CV3 is the value "010" and the second code string CV2 is the value "110" or "010", the code string generating section 42 determines that the fused recording mark FRM3 is formed at the location where the three recording marks RM should be originally formed. In this case, the code string generating section 42 replaces the fused recording mark FRM3 with a code string corresponding to the three recording marks RM to be originally formed.

That is, if the peak level of the variation pattern CH is equal to or larger than the third signal level V3 and smaller than the fourth signal level V4, the code string generating section 42 determines that the variation pattern CH is a pattern generated by the fused recording mark FRM3.

Specifically, for the place (portion surrounded by a solid line in the drawing) of the value "010" in the third code string CV3, the code string generating section 42 generates a code string C shown in FIG. 13K by replacing a code string CB3 (indicated by a dotted line in the drawing), which includes three continuous codes in the first code string CV1, with a replacement code string CR3 shown in FIG. 13J.

In addition, if the fourth code string CV4 is the value "01" or "10" and the third code string CV3 is the value "11", the code string generating section 42 determines that the fused recording mark FRM4 is formed at the location where the four recording marks RM should be originally formed. In this case, the code string generating section 42 replaces the fused recording mark FRM4 with a code string corresponding to the four recording marks RM to be originally formed.

That is, if the peak level of the variation pattern CH is equal to or larger than the fourth signal level V4, the code string generating section 22 determines that the variation pattern CH is a pattern generated by the fused recording mark FRM4.

Specifically, the code string generating section 42 generates the code string C shown in FIG. 13K by replacing a code string CB4 (indicated by a dotted line in the drawing), which includes four continuous codes in the first code string CV1 with a place (portion surrounded by a solid line in the drawing) of the value "11" in the third code string CV3 as the middle, with a replacement code string CR4 shown in FIG. 13J.

Thus, the code string generating section 42 can generate the code string C corresponding to the plurality of recording marks RM, which should be originally recorded, from the locations in which the fused recording marks FRM3 and FRM4 are actually formed on the optical information recording medium 100.

Then, the code string generating section 42 supplies the generated code string C to the demodulation processing section 23 (FIG. 5).

2-3. Signal Processing Procedure

Practically, the signal processor 33 performs a series of signal processing according to a signal processing procedure RT2 (FIG. 14) corresponding to the signal processing procedure RT1 in FIG. 11. That is, when a reproduction instruction of the optical information recording medium 100 is given, the signal processor 33 starts the signal processing procedure RT2 and moves to step SP21.

In step SP21, the variation detecting section 41 of the signal processor 33 compares the detection signal S with the first to fourth signal levels V1 to V4, and generates the first to fourth detection signals SV1 to SV4 (FIGS. 13B to 13E) on the basis of the comparison result. Then, the process moves to next step SP22.

In step SP22, the code string generating section 42 of the signal processor 33 generates the first to fourth code strings CV1 to CV4 (FIGS. 13F to 13I) on the basis of the first to fourth detection signals SV1 to SV4. Then, the process moves to next step SP23.

In step SP23, the code string generating section 42 of the signal processor 33 determines whether or not the code of the fourth code string CV4 is the value "10" or "11" and whether or not the code of the third code string CV3 is the value "11". Obtaining a positive result in step S23 indicates that the fused recording mark FRM4 is presumably formed since the peak level in the variation pattern CH is equal to or larger than the fourth signal level V4. In this case, the signal processor 33 moves to next step SP24.

In step SP24, the signal processor 33 generates the code string C (FIG. 13K) by replacing the code string CB4 of the first code string CV1 with the replacement code string CR4 (FIG. 13J) and supplies the code string C to the demodulation processing section 23. Then, the process moves to next step SP30.

On the other hand, obtaining a negative result in step SP23 indicates that at least the fused recording mark FRM4 is not recorded. In this case, the signal processor 33 moves to next step SP25.

In step SP25, the code string generating section 42 of the signal processor 33 determines whether or not the code of the third code string CV3 is the value "010" and whether or not the code of the second code string CV2 is the value "110" or "011". Obtaining a positive result in step SP25 indicates that the fused recording mark FRM3 is presumably formed since the peak level in the variation pattern CH is equal to or larger than the third signal level V3 and smaller than the fourth signal level V4. In this case, the signal processor 33 moves to next step SP26.

In step SP26, the signal processor 33 generates the code string C (FIG. 13K) by replacing the code string CB3 of the first code string CV1 with the replacement code string CR3 (FIG. 13J) and supplies the code string C to the demodulation processing section 23. Then, the process moves to next step SP30.

On the other hand, obtaining a negative result in step SP25 indicates that at least both the fused recording marks FRM3 and FRM4 are not recorded. In this case, the signal processor 33 moves to next step SP27.

In step SP27, the code string generating section 42 of the signal processor 33 determines whether or not the code of the second code string CV2 is the value "1". Obtaining a positive result in step SP27 indicates that the fused recording mark FRM2 is formed since the peak level in the variation pattern CH is equal to or larger than the second signal level V2 and smaller than the third signal level V3. In this case, the signal processor 13 moves to next step SP28.

In step SP28, the signal processor 33 generates the code string C by replacing a corresponding code string (not shown) of the first code string CV1 with a replacement code string (not shown) and supplies the code string C to the demodulation processing section 23. Then, the process moves to next step SP30.

On the other hand, obtaining a negative result in step SP27 indicates that it is not necessary to replace a code string since the fused recording marks FRM2, FRM3, and FRM4 are not formed. In this case, the signal processor 33 moves to next step SP29.

In step SP29, the signal processor 33 supplies the first code string CV1 to the demodulation processing section 23 as the code string C, similar to step SP5 (FIG. 11). Then, the process moves to next step SP30.

Then, in steps SP30 to SP32, the signal processor 33 performs the same processing as in steps SP6 to SP8 (FIG. 11). Thus, the signal processing procedure RT2 is ended.

Moreover, similar to the first embodiment, the signal processor 33 is configured to sequentially reproduce the information on the basis of the detection signal S by repeatedly executing the signal processing procedure RT2.

2-4. Operations and Effects

In the above configuration, the optical information reproducing apparatus 30 generates the light receiving signal S by irradiating the light beam L1 onto the optical information recording medium 100 and receiving the reflected light beam L2 obtained from the optical information recording medium 100 as a result of the irradiation.

The signal processor 33 of the optical information reproducing apparatus 30 generates the first to fourth detection signals SV1 to SV4 by comparing the detection signal S with the first to fourth signal levels V1 to V4, respectively, using the variation detecting section 41.

In addition, the code string generating section 42 of the signal processor 33 generates the first to fourth code strings CV1 to CV4 on the basis of the first to fourth detection signals SV1 to SV4, respectively.

Here, if the fourth code string CV4 is the value "10" or "01" and the third code string CV3 is the value "11", the code string generating section 42 replaces the neighboring code string CB4 in the first code string CV1 with the replacement code string CR4 corresponding to the four recording marks RM and sets it as the code string C.

Moreover, if the third code string CV3 is the value "010" and the second code string CV2 is the value "110" or "011", the code string generating section 42 replaces the neighboring code string CB3 in the first code string CV1 with the replacement code string CR3 corresponding to the three recording marks RM and sets it as the code string C.

In addition, when the second code string CV2 is the value "1", the code string generating section 42 replaces a neighboring code string in the first code string CV1 with a replacement code string corresponding to the two recording marks RM and sets it as the code string C.

Then, the signal processor 33 generates the coded data D on the basis of the code string C using the demodulation processing section 23 and reproduces the information on the basis of the coded data D using the decoding processing section 24.

Accordingly, even if two to four recording marks RM which are adjacent to each other within the optical information recording medium 100 are fused to form the fused recording marks FRM2 to FRM4, the optical information reproducing apparatus 30 can generate the code string C equivalent to the plurality of recording marks RM to be originally recorded.

That is, similar to the first embodiment, since the optical information reproducing apparatus 30 can generate the same code string C as in the case where the right recording mark RM is formed even when the right recording mark RM is not formed on the optical information recording medium 100, the optical information reproducing apparatus 10 can eventually reproduce the information equivalent to the original information.

Particularly in the second embodiment, since the information is recorded on the optical information recording medium 100 using the mark length recording method, not only the fused recording mark FRM2 but also the fused recording marks FRM3 and FRM4 can be formed.

In addition, the signal processor 33 can recognize the fused recording marks FRM2 to FRM4 by comparing the peak level of the variation pattern CH with the four steps of first to fourth signal levels V1 to V4.

In this case, the signal processor 33 can recognize the fused recording marks FRM2 to FRM4 on the basis of the appearance pattern of code "1" in each of the second to fourth code strings CV2 to CV4 by appropriately setting the four steps of first to fourth signal levels V1 to V4.

In addition, the optical information reproducing apparatus 30 can realize the same operations and effects as in the optical information reproducing apparatus 10 according to the first embodiment.

According to the above configuration, the optical information reproducing apparatus 30 generates the first to fourth detection signals SV1 to SV4 by comparing the detection signal S with the first to fourth signal levels V1 to V4, respectively, using the variation detecting section 41 of the signal processor 33. In addition, the code string generating section 42 of the signal processor 33 converts the first to fourth detection signals SV1 to SV4 into the first to fourth code strings CV1 to CV4, respectively. In this case, when forming a predetermined code pattern including the value "1" in the second to fourth code strings CV2 to CV4, the signal processor 33 replaces the code string CB of the first code string CV1 into the replacement code string CR and sets it as the code string C. Accordingly, the optical information reproducing apparatus 30 can generate the code string C equivalent to the plurality of recording marks RM, which should be originally recorded, even if the fused recording marks FRM2 to FRM4 are formed on the optical information recording medium 100.

3. Third Embodiment 3-1. Configuration of an Optical Information Reproducing Apparatus and an Information Recording Method An optical information reproducing apparatus 50 (FIG. 4) according to a third embodiment has the same configuration as the optical information reproducing apparatus 10 according to the first embodiment except that a signal processor 53 is provided instead of the signal processor 13.

The signal processor 53 (FIG. 5) has the same configuration as the signal processor 13 except that a variation detecting section 61 and a code string generating section 62 are provided instead of the variation detecting section 21 and the code string generating section 22.

Moreover, in the third embodiment, similar to the first embodiment, the information is recorded on the optical information recording medium 100 by forming each recording mark RM by the mark position recording method as shown in FIGS. 6A and 7A.

Accordingly, the fused recording mark FRM2 may be formed on the optical information recording medium 100, as shown in FIG. 9C.

3-2. Generation of a Code String

In the case where the fused recording mark FRM2 is formed on the optical information recording medium 100, it is thought that a high-level period of the first detection signal SV1 (FIG. 10C) is long, compared with a case where the normal recording mark RM is recorded.

Therefore, in the third embodiment, it is determined whether or not there is the fused recording mark FRM2 on the basis of the high-level period of the first detection signal SV1 as described above.

First, the variation detecting section 61 (FIG. 5) of the signal processor 53 determines whether or not the light receiving signal S exceeds a first signal level V1 with GND as a reference, as shown in FIG. 15A.

Then, as shown in FIG. 15B, the variation detecting section 61 generates a first detection signal SV1, which has a high level in a section where the light receiving signal S exceeds the first signal level V1 and has a low level in the remaining section, and supplies the first detection signal SV1 to the code string generating section 62 (FIG. 5).

The code string generating section 62 generates a first code string CV1 by converting a low-level place and a high-level place in the first detection signal SV1 into the values "0" and "1", respectively, as shown in FIG. 15C.

At the same time, the code string generating section 62 measures a high-level period (hereinafter, referred to as a detection period TD) of the first detection signal SV1 for each place where the first detection signal SV1 has a high level.

Then, the code string generating section 62 compares the detection period TD with a predetermined reference period TS. If the detection period TD is equal to or longer than the reference period TS, the code string generating section 62 determines that the fused recording mark FRM2 is formed at the location where two recording marks RM should be separately formed originally.

That is, if a period (that is, the detection period TD) for which the variation pattern CH exceeds the first signal level V1 is shorter than the reference period TS, the code string generating section 62 determines that the variation pattern CH is a pattern generated by the normal recording mark RM. In addition, if the period for which the variation pattern CH exceeds the first signal level V1 is equal to or longer than the reference period TS, the code string generating section 62 determines that the variation pattern CH is a pattern generated by the fused recording mark FRM2.

In this case, the code string generating section 62 generates a code string C shown in FIG. 15E by replacing a code string CB (FIG. 15C), which has a place of the value "1" in the first code string CV1 in the middle, with a replacement code string CR shown in FIG. 15D.

In addition, when the detection period TD is shorter than the reference period TS, the code string generating section 62 sets the first code string CV1 as the code string C.

Then, the code string generating section 62 supplies the generated code string C to the demodulation processing section 23 (FIG. 5).

Thus, the signal processor 53 determines the existence of the fused recording mark FRM2 on the basis of the detection period TD in the first detection signal SV1 and replaces the code string CB equivalent to the fused recording mark FRM2 with the replacement code string CR to thereby generate the code string C.

3-3. Signal Processing Procedure

Figure 16:
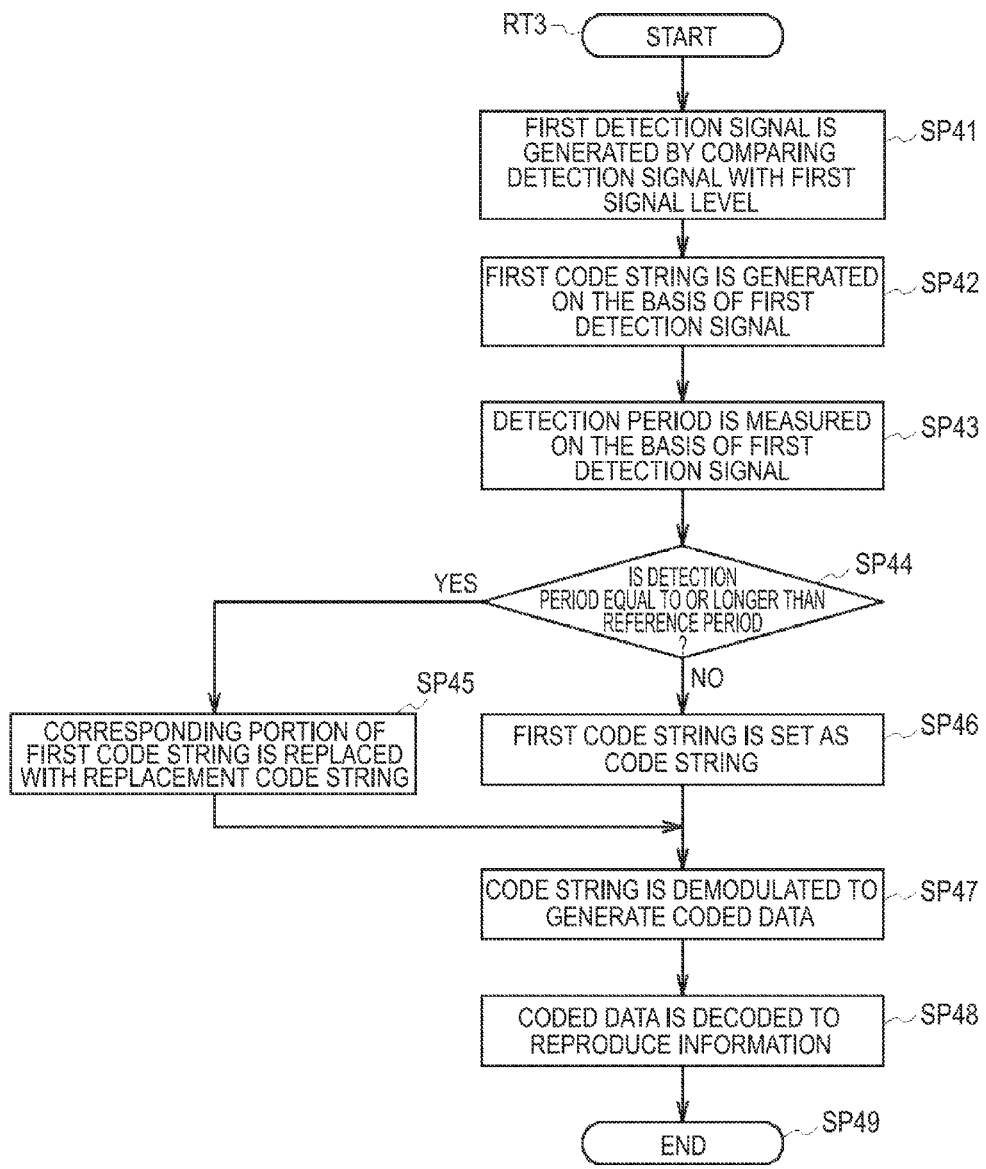
FIG. 16 is a flow chart showing a signal processing procedure.

In practice, the signal processor 53 executes a series of signal processing including the above-described processing of generating a code string according to a signal processing procedure RT3 shown in FIG. 16 corresponding to FIG. 11. That is, when a reproduction instruction of the optical information recording medium 100 is given, the signal processor 53 starts the signal processing procedure RT3 and moves to step SP41.

In step SP41, the variation detecting section 61 of the signal processor 53 compares the detection signal S with the first signal level V1, and generates the first detection signal SV1 (FIG. 15B) on the basis of the comparison result. Then, the process moves to next step SP42.

In step SP42, the code string generating section 62 of the signal processor 53 generates the first code string CV1 (FIG. 15C) on the basis of the first detection signal SV1. Then, the process moves to next step SP43.

In step SP43, the code string generating section 62 of the signal processor 53 measures the detection period TD for which the first detection signal SV1 has a high level. Then, the process moves to next step SP44.

In step SP44, the code string generating section 62 of the signal processor 53 determines whether or not the detection period TD is equal to or longer than the reference period TS. Obtaining a positive result in step SP44 indicates that the fused recording mark FRM2 is presumably formed since the detection period TD at that time is equal to or longer than the reference period TS. In this case, the signal processor 53 moves to next step SP45.

In step SP45, the signal processor 53 generates the code string C (FIG. 15E) by replacing the code string CB, which has the value "1" in the first code string CV1 in the middle, with the replacement code string CR (FIG. 15D) and supplies the code string C to the demodulation processing section 23. Then, the process moves to next step SP47.

On the other hand, obtaining a negative result in step SP44 indicates that it is not necessary to replace a code string since the fused recording mark FRM2 is not formed. In this case, the signal processor 53 moves to next step SP47.

Then, in steps SP47 to SP49, the signal processor 53 performs the same processing as in steps SP6 to SP8 (FIG. 11). Thus, the signal processing procedure RT3 is ended.

Moreover, similar to the first embodiment, the signal processor 53 is configured to sequentially reproduce the information on the basis of the detection signal S by repeatedly executing the signal processing procedure RT3.

3-4. Operations and Effects

In the above configuration, the signal processor 53 of the optical information reproducing apparatus 50 generates the first detection signal SV1 by comparing the detection signal S with the first signal level V1 using the variation detecting section 61.

In addition, the code string generating section 62 of the signal processor 53 converts the first detection signal SV1 into the first code string CV1. In addition, the code string generating section 62 measures the detection period TD for which the first detection signal SV1 has a high level. If the detection period TD is equal to or longer than the reference period TS, the code string generating section 62 replaces the neighboring code string CB in the first code string CV1 with the replacement code string CR and sets it as the code string C.

Then, the signal processor 53 generates the coded data D on the basis of the code string C using the demodulation processing section 23 and reproduces the information on the basis of the coded data D using the decoding processing section 24.

Accordingly, even if two recording marks RM which are adjacent to each other within the optical information recording medium 100 are fused to form the fused recording mark FRM2, the optical information reproducing apparatus 10 can generate the code string C equivalent to the two recording marks RM to be originally recorded.

In this case, the signal processor 53 can check the fused recording mark FRM2 from only the detection period TD in the first detection signal SV1. Accordingly, unlike the first and second embodiments, it is preferable that the variation detecting section 61 and the code string generating section 62 of the signal processor 53 generate one kind of first detection signal SV1 using one kind of first signal level L1.

In addition, the optical information reproducing apparatus 50 can realize the same operations and effects as in the optical information reproducing apparatus 10 according to the first embodiment.

According to the above configuration, the optical information reproducing apparatus 50 generates the first detection signal SV1 by comparing the detection signal S with the first signal level V1 using the variation detecting section 61 of the signal processor 53. In addition, the code string generating section 62 of the signal processor 53 converts the first detection signal SV1 into the first code string CV1. At the same time, if the detection period TD is equal to or longer than the reference period TS, the code string generating section 62 of the signal processor 53 replaces the code string CB with the replacement code string CR and sets it as the code string C. Accordingly, the optical information reproducing apparatus 50 can generate the code string C equivalent to the two recording marks RM, which should be originally recorded, even if the fused recording mark FRM2 is formed on the optical information recording medium 100.

4. Other Embodiments

Moreover, in the first embodiment, the case has been described in which a code string having a minimum run set to "1" is recorded on the optical information recording medium 100 using the mark position recording method. Moreover, in the second embodiment, the case has been described in which a code string having a minimum run set to "2" is recorded using the mark length recording method.

The present invention is not limited to these cases, and may also be applied to the case where a code string with an arbitrary minimum run is recorded on the optical information recording medium 100 by the mark position recording method or the case where a code string with an arbitrary shortest mark length is recorded on the optical information recording medium 100 by the mark length recording method.

In this case, if it is determined that the fused recording mark FRM2 or the like is formed on the basis of the correspondence relationship between the pattern of a code string, which may appear, and the fused recording mark FRM2 or the like, which may be formed, the code string CB may be appropriately replaced with the replacement code string CR corresponding to the fused recording mark FRM2 or the like.

Moreover, in the second embodiment, the case has been described in which when two to four recording marks FRM may be fused to form the fused recording marks FRM2 to FRM4, four steps of signal levels V are set and the existence of the fused recording mark FRM is determined on the basis of four kinds of code strings CV.

The present invention is not limited to this, and it is also possible to set the signal levels V, the number of which corresponds to the number of kinds of the fused recording mark FRM which may be formed, and to determine the existence of each fused recording mark FRM on the basis of the code strings CV the number of which corresponds to the number of steps. In this case, it is preferable that the signal levels V are appropriately set according to the peak levels which are different according to the kind of fused recording mark FRM.

This may be generalized as follows. That is, it is assumed that information is recorded on the optical information recording medium 100 by the mark length recording method in a state where the information is encoded as binary codes having a maximum code length of n (where n is a natural number of 2 or more). The variation detecting section 41 compares the peak level of the variation pattern CH with each of the first signal level and the k-th signal level (where k is all natural numbers satisfying $2 \leq k \leq n$) and generates the first detection signal SV1 and the k-th detection signal SVk.

Then, the code string generating section 42 generates the first code string CV1 and the k-th code string CVk from the first detection signal SV1 and the k-th detection signal SVk, respectively. In addition, when the peak level of the variation pattern CH exceeds the first signal level V1 and does not exceed the second signal level V2, the code string generating section 42 generates the first code string CV1, in which the variation pattern CH is set as the code "1" corresponding to one recording mark RM, from the code pattern of the first code string CV1 and the k-th code string CVk. Moreover, when the peak level exceeds a (k−1)-th signal level V(k−1) and does not exceed a k-th signal level Vk (where k is a natural number k satisfying ($3 \leq k \leq n$)), the code string generating section 42 replaces a portion, which is equivalent to the variation pattern CH of the first code string CV1, with the replacement code string CR equivalent to the fused recording mark FRM corresponding to the (k−1)-th signal level V(k−1). In addition, when the peak level exceeds the n-th signal level Vn, the code string generating section 42 replaces the portion, which is equivalent to the variation pattern CH of the first code string CV1, with the replacement code string CR equivalent to the fused recording mark FRM corresponding to the n-th signal level.

Moreover, in the first embodiment, the case has been described in which it is determined that the fused recording mark FRM is formed on the basis of the appearance pattern of codes in the second code string CV2, specifically, when it is the value "1".

The present invention is not limited to this case. For example, it may be determined that the fused recording mark FRM is formed on the basis of the second detection signal SV2. In short, it is preferable to check that the peak level of the variation pattern CH in the detection signal S exceeds the second signal level L2 and to determine that the fused recording mark FRM is formed from the checking result.

Moreover, in the second embodiment described above, it is determined that the fused recording mark FRM4 is formed when the fourth code string CV4 is the value "10" or "01" and the third code string CV3 is the value "11". In addition, it is determined that the fused recording mark FRM3 is formed when the third code string CV3 is the value "010" and the second code string CV2 is the value "110" or "011".

The present invention is not limited to this, and it may be determined whether or not each fused recording mark FRM is formed on the basis of the combination of other arbitrary code strings.

Moreover, in the third embodiment, the case has been described in which the high-level period (detection period TD) of the detection signal S is compared with the reference period TS and it is determined, on the basis of the comparison result, to which of the normal recording mark RM and the fused recording mark FRM the variation pattern CH of the detection signal S corresponds.

The present invention is not limited to this case. For example, the detection period TD may be compared with two kinds of reference periods TS1 and TS2 and it may be determined, on the basis of the comparison result, to which of the normal recording mark RM, the fused recording mark FRM2, and the fused recording mark FRM3 the variation pattern CH of the detection signal S corresponds. That is, the detection period TD may be made to correspond to the plurality of kinds of fused recording marks FRM.

Moreover, in the first and second embodiments, the cases have been described in which the existence of the fused recording mark FRM is determined according to the peak level of the variation pattern CH which appears in the detection signal S. Moreover, in the third embodiment, the case has been described in which the existence of the fused recording mark FRM is determined on the basis of the high-level period (detection period TD) of the detection signal S.

The present invention is not limited to this case. For example, the existence of the fused recording mark FRM may also be determined by the combination of the peak level of the variation pattern CH appearing in the detection signal S and the period for which the detection signal S exceeds a predetermined signal level. In short, the existence and the kind of the fused recording mark FRM may be determined according to the size of the variation pattern CH. In this case, the accuracy in determining the existence of the fused recording mark FRM can be improved.

Moreover, in the first embodiment, the case has been described in which the optical information reproducing apparatus 10 reproduces the information from the optical information recording medium 100 with an approximately disk shape. The present invention is not limited to this case. For example, the optical information reproducing apparatus 10 may reproduce the information from optical information recording media with various shapes, such as a rectangular parallelepiped shape. In this case, the main point is that the recording marks RM as holes are preferably formed along a virtual track on the optical information recording medium 100 and the optical information reproducing apparatus 10 preferably moves the focal point of the light beam L1 along the track. The same is true for the second and third embodiments.

Moreover, in the first embodiment, the case has been described in which the optical information reproducing apparatus 10 performs only reproduction of information from the optical information recording medium 100. The present invention is not limited to this case, and the optical information reproducing apparatus 10 may also be made to record the information on the optical information recording medium 100. That is, the optical information reproducing apparatus 10 may be made as an optical information recording/reproducing apparatus. The same is true for the second and third embodiments.

Moreover, in the above embodiments, the case has been described in which the recording marks RM, which are bubbles, are formed on the optical information recording medium 100 by the two-photon absorption response. The present invention is not limited to this case, and the recording mark RM which is a hole may also be formed on the optical information recording medium 100 by other various methods. In short, the present invention can be applied to the case where a plurality of holes may be fused to form the fused recording mark FRM when forming the recording mark RM which is a hole.

Moreover, in the first embodiment, the case has been described in which the signal processor 13 generates the coded data D on the basis of the code string C and reproduces the information. The present invention is not limited to this case. For example, the signal processor 13 may also be configured not to perform processing until final information reproduction by supplying the coded data D or the code string C to an external decoder or the like. The same is true for the second and third embodiments.

Moreover, in the first embodiment, the case has been described in which "0" is set when there is no recording mark RM on the optical information recording medium 100 and the signal level of the detection signal S is relatively low and "1" is set when there is a recording mark RM on the optical information recording medium 100 and the signal level of the detection signal S is relatively high.

The present invention is not limited to this case. For example, "1" may be set when there is no recording mark RM and the signal level V of the detection signal S is relatively low and "0" may be set when there is a recording mark RM and the signal level V of the detection signal S is relatively high, in contrast to those described above.

Moreover, in the above embodiments, the case has been described in which the optical information reproducing apparatus 10 as an optical information reproducing apparatus is formed by the laser 3 and the objective lens 6 as an irradiation section, the light receiving element 8 as a light receiving section, the variation detecting section 21 as a detection section, and the code string generating section 22 as a code string generating section.

However, the present invention is not limited to this case, and the optical information reproducing apparatus may also be formed by an irradiation section, a light receiving section, a detection section, and a code string generating section with various kinds of configurations.

The present invention may also be applied to an optical disk device that reproduces the information, such as images or sound, or various kinds of data, from an optical disk.

The present application contains subject matter related to that disclosed in Japanese Priority Patent Application JP 2009-145603 filed in the Japan Patent Office on Jun. 18, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical information reproducing apparatus comprising:
   an irradiation section to irradiate a light beam onto an optical information recording medium, in which a plurality of holes are formed along a virtual track on a recording medium, along the virtual track according to encoded information;
   a light receiving section to receive a reflected light beam when the light beam is reflected by the optical information recording medium and to sequentially generate a light receiving signal corresponding to light intensity;
   a detection section to detect a first variation pattern appearing when a signal level of the light receiving signal changes according to a first hole of the plurality of holes and a second variation pattern appearing when a signal level of the light receiving signal changes according to a second hole of the plurality of holes; and
   a code string generating section to generate a code string based on the first and second variation patterns,
   wherein the first variation pattern does not exceed a threshold and the code string generating section generates a first code based on the first variation pattern, the first code including a first bit, and
   wherein the second variation pattern exceeds the threshold and the code string generating section generates a second code based on the second variation pattern, the second code including a plurality of bits representing a second plurality of holes.

2. The optical information reproducing apparatus according to claim 1, wherein:
   the detection section detects whether or not a peak level, a variation width of which from a reference signal level is largest in the second variation pattern, exceeds a predetermined first signal level and whether or not the peak level exceeds a predetermined second signal level higher than the first signal level; and
   the code string generating section generates the second code from the second variation pattern when the peak level exceeds the predetermined second signal level.

3. The optical information reproducing apparatus according to claim 2, wherein:
   the detection section generates a first detection signal, which changes to a high level or a low level according to whether or not the detection signal exceeds the predetermined first signal level, and a second detection signal, which changes to a high level or a low level according to whether or not the detection signal exceeds the predetermined second signal level; and
   the code string generating section generates first and second code strings by encoding the first and second detection signals, respectively, and generates the first code and the second code on the basis of a code pattern appearing in the first and second code strings.

4. The optical information reproducing apparatus according to claim 1, wherein:
   the information is recorded on the optical information recording medium by a mark position recording method in a state where the information is encoded as binary codes having a minimum run of 1; and
   the code string generating section generates one inverted code from the first variation pattern and generates the second code, which includes a continuous code string having an inverted code, a non-inverted code, and an inverted code, from the second variation pattern.

5. The optical information reproducing apparatus according to claim 1, wherein the code string generating section generates the second code to correct an error detected based on the signal level of the second variation pattern.

6. The optical information reproducing apparatus according to claim 1, wherein the second plurality of holes have fused to form the second hole.

7. An optical information reproducing method comprising:
   irradiating a light beam onto an optical information recording medium, in which a plurality of holes are formed along a virtual track in a recording medium, along the virtual track according to encoded information, receiving a reflected light beam when the light beam is reflected by the optical information recording medium, and sequentially generating a light receiving signal corresponding to light intensity;
   detecting a first variation pattern appearing when a signal level of the light receiving signal changes according to a first hole of the plurality of holes and a second variation pattern appearing when a signal level of the light receiving signal changes according to a second hole of the plurality of holes, wherein the first variation pattern does not exceed a threshold and the second variation pattern exceeds the threshold;
   generating a first code based on the first variation pattern, the first code including a first bit; and generating a second code based on the second variation pattern, the second code including a plurality of bits representing a second plurality of holes.

* * * * *